Figure 1:
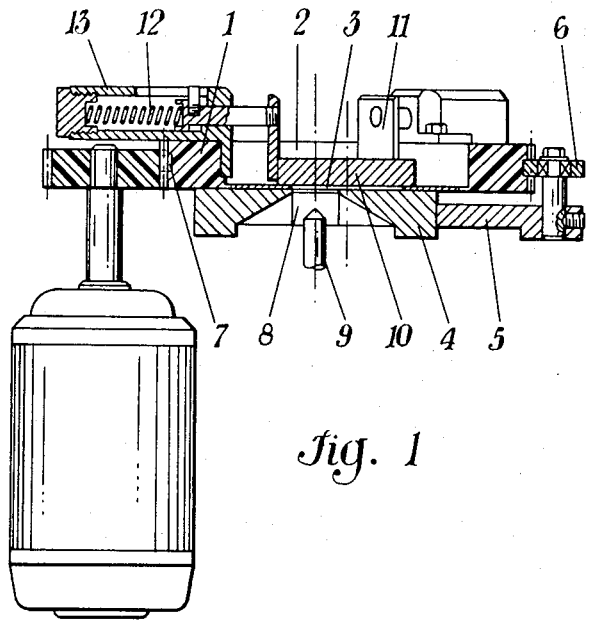

United States Patent
Sturlese et al.

[11] 3,711,201
[45] Jan. 16, 1973

[54] APPARATUS FOR DETERMINING TRACES OF ELEMENTS IN MASSIVE SAMPLES BY OPTICAL EMISSION SPECTROMETRY

[75] Inventors: Stefano Sturlese, Rome; Giovanni Battista Quaglia, Genova, Rome; Bartolomeo Morello, Rome, all of Italy

[73] Assignee: Centro Sperimentale Metallurgico S.p.A., Rome, Italy

[22] Filed: May 20, 1971

[21] Appl. No.: 145,337

[30] Foreign Application Priority Data

June 5, 1970 Italy..............................51198 A/70

[52] U.S. Cl.................................356/86, 356/244
[51] Int. Cl...............................................G01j 3/30
[58] Field of Search.................356/74, 85, 86, 244

[56] References Cited

UNITED STATES PATENTS

| 3,583,812 | 6/1971 | Blum et al. ............................356/86 |
| 2,758,238 | 8/1956 | Todd......................................356/86 |
| 3,188,180 | 6/1965 | Höller...................................356/86 |

OTHER PUBLICATIONS

Controlled Atmosphere Excitation in Non-Enclosed Spark Stands; Boyd et al., Applied Spectroscopy; Vol. 19, No. 1 Jan. 1965, pgs. 22–25.

*Primary Examiner*—Ronald L. Wibert
*Assistant Examiner*—V. P. McGraw
*Attorney*—Young & Thompson

[57] ABSTRACT

Apparatus for determining traces of elements in massive samples by optical emission spectrometry comprises an attachment to a Petrey table which is a rotatable sample holder that rotates eccentric to and in gas-tight relation relative to the Petrey table, so that the path of the projection of the electrode on the sample is circular. The material of the sample holder is a self-lubricating material, e.g. polytetrafluoroethylene. The sample holder carries resilient clamps for centering the sample relative to the sample holder.

6 Claims, 3 Drawing Figures

APPARATUS FOR DETERMINING TRACES OF ELEMENTS IN MASSIVE SAMPLES BY OPTICAL EMISSION SPECTROMETRY

The present invention regards a rotatable device to be used for analyzing traces of volatile elements in massive samples, particularly of steel, through emission optic spectrometry with excitation under controlled atmosphere; more particularly, the invention concerns a sample-holder, gas-tight, rotatable at variable and adjustable velocity, suitable to be applied to the stand of an emission optic spectrometer with excitation under controlled atmosphere of argon or other gases.

The optical emission spectrometers, with excitation under controlled atmosphere for example the "Quantovac" (registered Trade Mark), are furnished with a chamber in which the controlled atmosphere is created and there are present the electrode as well as the counterelectrode between which the discharge takes place.

According to the conventional analytical techniques the sample to be analyzed operates as an electrode and remains stationary during the discharge between it and the counter-electrode.

However, by using these techniques, in some cases and for some components of the material to be analyzed, it is not possible to reach the levels of concentration as required by the industrial needs.

In this respect the case is typical of the analysis of easily volatile elements, present in low concentration (5 to 100 p.p.m.) in metal samples. In fact it is known, e.g., that the spectrometric determination of lead in the stainless steels presents the highest industrial interest for contents included between 5 and 60 p.p.m. However, at these concentrations, the intensity of the most sensible spectral line of lead, having a 2203.5 Angstrom wavelength, is reduced to so low values, with respect to the spectrum background, as to make impossible the determination of said element.

The purpose of the present invention is to provide an auxiliary accessory device for emission spectrometers under controlled atmosphere, capable of rendering possible the quantitative analysis of volatile elements present in very low concentrations in metallic materials, such as for example lead in the stainless steels.

In fact it has been found that, causing the sample electrode to rotate during the discharge, in such a way as the said discharge will take place between the counter-electrode and a continuously renewed surface of the sample itself, a remarkable improvement is obtained in the sensibility of the analysis of the volatile elements contained therein.

According to the present invention, a device is provided including in combination: a sample-holder for massive samples; means for fixing said sample-holder to the Petrey table allowing for its rotation at variable and adjustable velocity; means for fixing the metallic sample to the sample-holder.

Figure 2:
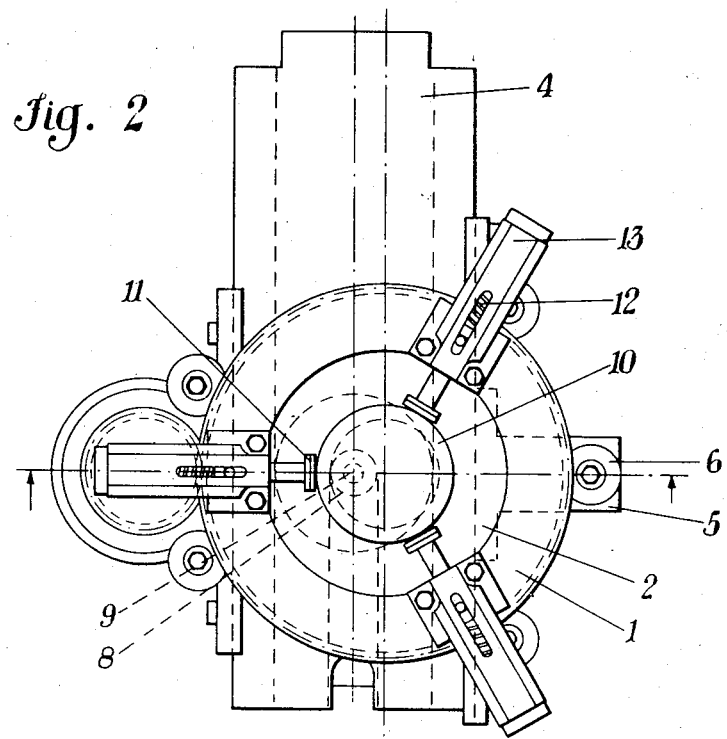
Figure 3:
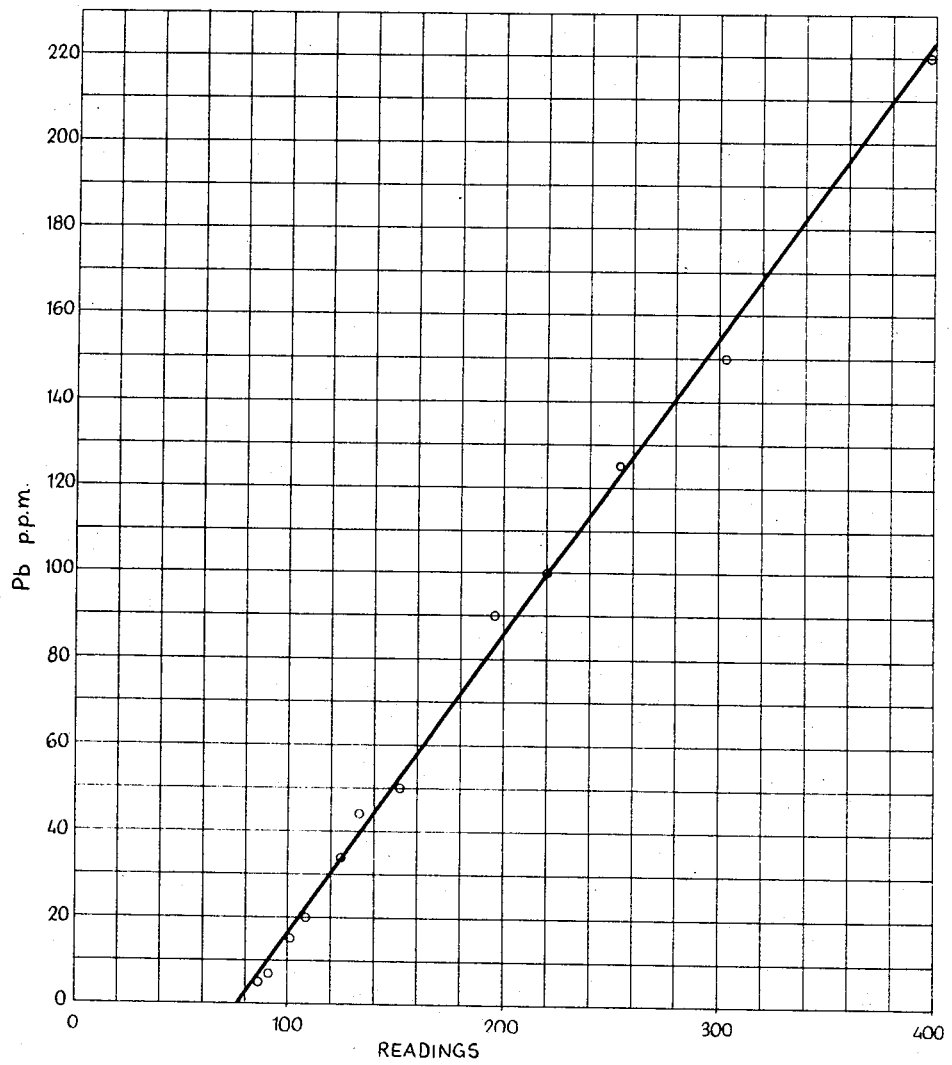

Other features and advantages of the present invention will become apparent from a consideration of the following description, taken in connection with the accompanying drawings, in which:

FIG. 1 is a side cross-sectional view of apparatus according to the present invention;
FIG. 2 is a top plan view thereof; and
FIG. 3 is a calibration curve of lead in stainless steel.

With reference to FIGS. 1 and 2, representing an axial longitudinal cross section and a view from the top of the device, respectively, the sample-holder consists in a circular platform (1), of self-lubrificating material, for instance polytetrafluorethylene, in the central part of which there is a cylindrical cavity 2 to receive the metallic sample, and co-axial to the above mentioned platform. In the bottom of this cavity a circular through-hole 3 is opened, being co-axial to platform 1 and cavity 2. Said sample-holder is then fixed, gas-tight, to the Petrey table 4 by at least three supports 5, each having a guiding wheel 6 fitted in a lateral groove 7 of platform 1. The hole 8 of Petrey table 4 is co-axial with the counter-electrode 9, with a diameter lesser than that of hole 3, and located so that the horizontal projections of the two holes are tangent to each other. The sample 10 is placed in the cavity 2 so as to plug the hole 3 and is kept in this position by arms 11, each of them being pushed by a spring 12 housed in a guide 13 rigid with the platform 1. Said sample-holding system can rotate about its vertical axis at variable and adjustable speed imparted to the gear shaped contour of the platform 1 by coupling to a variable-and-adjustable- speed motor 14.

However, it will be obvious to any skilled in the art that any system to hold the sample in the desired location, be it either mechanical, oleo- or fluo-dynamic, magnetic or electromagnetic, comes within the scope of the present invention and that the holding means herein described are to be understood only as a preferred embodiment.

By way of example, among the other possible system, another holding system can be mentioned, by which the sample can be held through a mandrel contrivance, subject to previous suitable changes in the embodiment of platform 1. Another holding system for the sample, allowing for its rotation, can be achieved by changing the location of the sample clamp pin, which is comprised in the ancillary equipment normally supplied with the spectrometer, so that its end will coincide with the rotation axis of the sample instead of the axis of the counterelectrode as usually occurs. Of course, in this last case, constructive changes in the pre-existing equipment should be necessary with consequent complications in the mounting and dismounting operations.

Favorable features of the device object of present invention are the ease, rapidity and reproducibility of the operation of assembly and disassembly thereof without having to alter the optical alignment of the receiving system and to change the preexisting equipment.

Only for illustrative and not limitative purposes an example of application of present invention is given hereunder.

EXAMPLE

FIG. 3 shows a calibration curve of Pb in samples of stainless steel of the series AISI 304, with known scalar Pb content, purposely prepared.

The spectrometer measurements have been carried out with a vacuum spectrometer equipped with the present disclosed device, working with the electrical zero set to zero in the following operative conditions:

Source:
  capacitance— 25 $\mu F$
  inductance— 360 $\mu H$
  resistance— 5 $\Omega$ voltage— 650 V
Sample: negative
Counter-electrode: silver rod, with 90° conical tip, positive
Argon flow: 5 liters per min
Integration time: 20 sec approximately (as determined by the integrated intensity of the reference line Fe 2714.4 A)
Rotation velocity of the sample: 3 r.p.m.

From the examination of the calibration curve it will clearly appear to those skilled in the art with the concentration equivalent to the background equals about 52 p.p.m. This means that, by using the rotating sample-holding device, object of present invention, results can be obtained about ten times more favorable than those obtained by an analysis carried out on a sample kept stationary to which under the same operating conditions, relates a concentration equivalent to background of about 600 p.p.m.

The present invention has been described in a preferred embodiment but it must be understood that changes may be made without going beyond the scope of the appended claims.

Having thus described the present invention, what is claimed is:

1. Apparatus for determining traces of elements in massive samples by optical emission spectrometry, comprising a Petrey table having an opening therethrough and an electrode in alignment with said opening, a circular platform rotatable on said Petrey table in gas-tight relation therewith, means for rotating said platform on said Petrey table about an axis eccentric to said electrode, said platform having a central opening therethrough that communicates with said opening through said Petrey table to expose a said sample to said electrode, and means carried by said platform for retaining said sample centered on said platform and covering said platform opening whereby upon rotation of said platform, different portions of a said sample lying on a circular path are exposed to said electrode.

2. Apparatus as claimed in claim 1, said platform having a central cavity in which the said sample is disposed, said opening through said platform communicating with said central cavity, said central cavity being coaxial with the axis of rotation of said platform.

3. Apparatus as claimed in claim 1, the margins of said platform opening and Petrey table opening both being circular and tangential to each other in all positions of said platform, said platform opening being of substantially larger diameter than said Petrey table opening.

4. Apparatus as claimed in claim 1, said platform being of self-lubricating plastic material, and mounting means for said platform comprising at least three guide wheels on said Petrey table that roll in a groove about the periphery of said platform.

5. Apparatus as claimed in claim 1, said rotating means comprising gear teeth on the periphery of said platform in mesh with gear teeth on a drive means.

6. Apparatus as claimed in claim 1, said retaining means comprising a plurality of arms that engage spaced portions of the periphery of the sample, and spring means carried by said platform and urging said arms radially inwardly toward the sample.

* * * * *